United States Patent
Park et al.

(10) Patent No.: US 9,300,376 B2
(45) Date of Patent: Mar. 29, 2016

(54) TRANSMITTING APPARATUS, RECEIVING APPARATUS, AND CONTROL METHODS THEREOF

(71) Applicant: SAMSUNG ELECTRONICS CO., LTD., Suwon-si (KR)

(72) Inventors: Jung-Hyun Park, Hwaseong-si (KR); Jung-Il Han, Seongnam-si (KR); Joo-sung Park, Suwon-si (KR); Jung-pil Yu, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/323,465

(22) Filed: Jul. 3, 2014

(65) Prior Publication Data

US 2015/0010101 A1   Jan. 8, 2015

Related U.S. Application Data

(60) Provisional application No. 61/843,187, filed on Jul. 5, 2013.

(30) Foreign Application Priority Data

Jun. 3, 2014   (KR) .......................... 10-2014-0067800

(51) Int. Cl.
   *H04B 7/02*  (2006.01)
   *H04B 7/04*  (2006.01)
   *H04B 7/06*  (2006.01)

(52) U.S. Cl.
   CPC .............. *H04B 7/0426* (2013.01); *H04B 7/024* (2013.01); *H04B 7/0669* (2013.01); *H04B 7/0671* (2013.01); *H04B 7/0689* (2013.01)

(58) Field of Classification Search
   CPC ..................................................... H04B 7/0671
   USPC ........................................................... 375/267
   See application file for complete search history.

(56) References Cited

U.S. PATENT DOCUMENTS

| | | | |
|---|---|---|---|
| 2006/0077886 A1* | 4/2006 | Oh et al. | 370/208 |
| 2006/0165008 A1* | 7/2006 | Li et al. | 370/252 |

(Continued)

FOREIGN PATENT DOCUMENTS

| | | |
|---|---|---|
| KR | 10-2010-0085401 A | 7/2010 |
| KR | 10-2011-0041274 A | 4/2011 |

(Continued)

OTHER PUBLICATIONS

Written Opinion for PCT/KR2014/006015 dated Nov. 13, 2014 [PCT/ISA/237] English.

(Continued)

*Primary Examiner* — Santiago Garcia
(74) *Attorney, Agent, or Firm* — Sughrue Mion, PLLC

(57) ABSTRACT

A signal transmitting apparatus, a signal receiving apparatus and methods thereof are provided. A signal transmitting apparatus which transmits a signal to realize a diversity gain together with a signal transmitted from another transmitting apparatus in a multi input single output (MISO) method includes a first transmitter configured to transmit a first signal, a second transmitter configured to transmit a second signal, and a controller configured to control the first signal and the second signal to be transmitted in a first cooperative communication method, wherein the controller controls the first signal and the second signal to be transmitted together with the signal transmitted from another transmitting apparatus in a second cooperative communication method.

19 Claims, 18 Drawing Sheets

(56) References Cited

U.S. PATENT DOCUMENTS

| | | | |
|---|---|---|---|
| 2006/0193245 A1* | 8/2006 | Aghvami et al. | 370/208 |
| 2007/0211815 A1* | 9/2007 | Pan et al. | 375/267 |
| 2008/0080449 A1* | 4/2008 | Huang et al. | 370/342 |
| 2009/0316807 A1* | 12/2009 | Kim et al. | 375/260 |
| 2010/0246721 A1* | 9/2010 | Chen et al. | 375/316 |
| 2010/0309999 A1* | 12/2010 | Yang et al. | 375/260 |
| 2011/0081934 A1* | 4/2011 | Imamura et al. | 455/522 |
| 2011/0110307 A1* | 5/2011 | Ko et al. | 370/328 |
| 2011/0142003 A1* | 6/2011 | Kuchi et al. | 370/330 |
| 2011/0194495 A1* | 8/2011 | Seo et al. | 370/328 |
| 2011/0207487 A1* | 8/2011 | Yang et al. | 455/507 |
| 2012/0195351 A1* | 8/2012 | Banwell et al. | 375/219 |
| 2012/0213310 A1 | 8/2012 | Ko et al. | |
| 2012/0230380 A1* | 9/2012 | Keusgen et al. | 375/227 |
| 2012/0275530 A1 | 11/2012 | Nazar et al. | |
| 2013/0100833 A1 | 4/2013 | Xu et al. | |
| 2013/0128778 A1* | 5/2013 | Bennett | 370/277 |
| 2013/0212649 A1* | 8/2013 | Hawkes et al. | 726/4 |

FOREIGN PATENT DOCUMENTS

| | | |
|---|---|---|
| WO | 2009/066208 A2 | 5/2009 |
| WO | 2012/146280 A1 | 11/2012 |

OTHER PUBLICATIONS

Communication from the European Patent Office issued Dec. 8, 2014, in a counterpart European Application No. 14175742.7.

* cited by examiner

MISO receive region
(diversity 4)

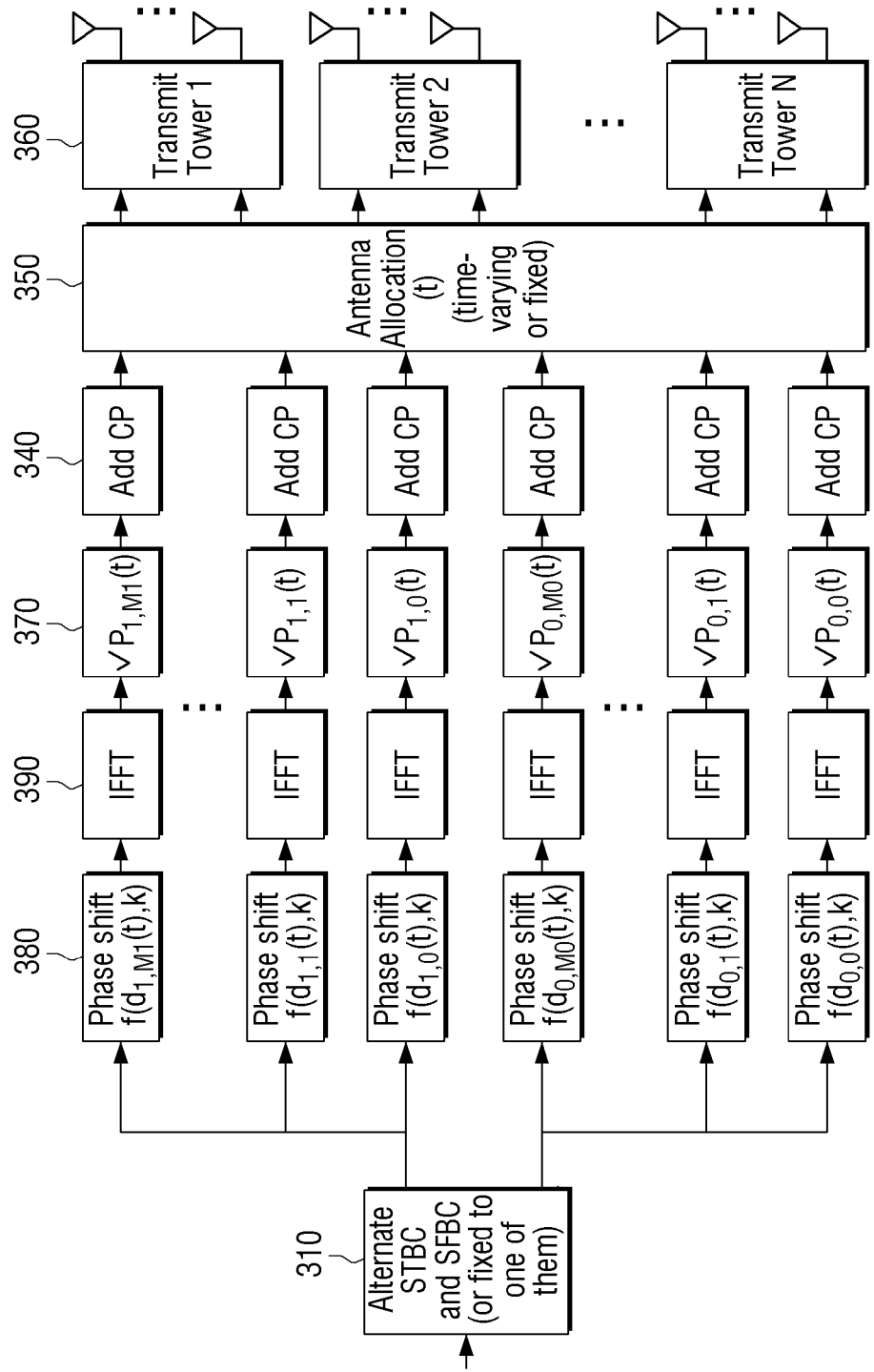

TRANSMITTING APPARATUS, RECEIVING APPARATUS, AND CONTROL METHODS THEREOF

CROSS-REFERENCE TO RELATED APPLICATIONS

This application claims priority from U.S. Provisional Application No. 61/843,187, filed on Jul. 5, 2013, in the United States Patent and Trademark Office, and Korean Patent Application No. 10-2014-0067800, filed on Jun. 3, 2014, in the Korean Intellectual Property Office, the disclosures of which are incorporated herein by reference in their entirety.

BACKGROUND

1. Field

Apparatuses and methods consistent with the exemplary embodiments of the inventive concept relate to a transmitting apparatus, a receiving apparatus, and control methods thereof, and more particularly, to a transmitting apparatus including a plurality of transmission antennas, a receiving apparatus, and control methods thereof.

2. Description of the Related Art

Due to increased demand for diverse multimedia information of wireless mobile communication systems, demand for high speed data communication has increased recently. In order to reply to the market demand, International Mobile Telecommunication (IMT)-Advanced aims to raise the performance of current mobile phone systems up to downlink 1 Gbps and uplink 500 Mbps. Also, in order to enhance the performance of current mobile phone systems, main technologies such as multi input multi output (MIMO), cognitive radio (CR), and coordinated multi-point (CoMP) have developed.

Space-time coding is an efficient technology to reduce performance degradation caused by fading in a wireless mobile communication system. Alamouti has suggested space-time coding to obtain a diversity gain using two antennas at a transmitting end and one antenna at a receiving end. This space-time coding may maximize the efficiency by using orthogonal frequency division multiplexing (OFDM) together since frequency selectivity is not considered. In addition, the space-time coding using multiple antennas may have strengths of enhancing stability of communication links and reception performance.

Accordingly, there is a need for a method for efficiently transmitting a signal in diverse channel environments using multiple antennas.

SUMMARY

One ore more exemplary embodiments of the inventive concept may overcome the above disadvantages and other disadvantages not described above. Also, the exemplary embodiments are not required to overcome the disadvantages described above, and may not overcome any of the problems described above.

One or more exemplary embodiments provide a transmitting apparatus, which is capable of efficiently transmitting a signal in diverse channel environments using multiple antennas, a receiving apparatus, and control methods thereof.

According to an aspect of an exemplary embodiment, there is provided a transmitting apparatus which transmits a signal to realize a diversity gain together with a signal transmitted from another transmitting apparatus in a multi input single output (MISO) method. The transmitting apparatus may include: a first transmitter configured to transmit a first signal, a second transmitter configured to transmit a second signal, and a controller configured to control the first signal and the second signal to be transmitted in a first cooperative communication method, wherein the controller controls the first signal and the second signal to be transmitted together with the signal transmitted from the other transmitting apparatus in a second cooperative communication method.

Each of the first and second cooperative communication methods may be a coded cooperative communication method or a cyclic delay diversity (CDD) cooperative communication method.

When the first cooperative communication method is the CDD cooperative communication method, and the second cooperative communication method is the coded cooperative communication method, at least one of transmission power and a delay time of the first transmitter may be different from the second transmitter.

When the first cooperative communication method is the CDD cooperative communication method, and the second cooperative communication method is the coded cooperative communication method, at least one of transmission power and a delay time of each of the first transmitter and the second transmitter may vary according to time or fixed.

The coded cooperative communication method may be at least one of a space-time block code (STBC) method and a space-frequency block code (SFBC) method.

In this case, the STBC method or the SFBC method may be variably selected according to time.

The controller may include: a coder configured to perform the STBC or the SFBC coding of an input signal to output the first signal and second signals; an inverse fast Fourier transformer configured to perform inverse fast Fourier transform (IFFT) on the coded first and second signals; a delayer configured to apply a cyclic delay to at least one of the IFFT-performed first and second signals; a guard interval inserter configured to insert a guard interval into the cyclic-delayed first and second signals; and an antenna allocator configured to allocate the guard-interval-inserted first and second signals to antennas considering a diversity gain according to the first and second cooperative communication methods.

Alternatively, the controller may include: a coder configured to perform the STBC or the SFBC coding of an input signal to output the first and second signals; a phase shifter configured to apply a phase delay to at least one of the coded first and second signals; an inverse fast Fourier transformer configured to perform IFFT on the first and second signals at least one of which is phase-delayed; a guard interval inserter configured to insert a guard interval into the IFFT-performed first and second signals; and an antenna allocator configured to allocate the guard-interval-inserted first and second signals to antennas considering a diversity gain according to the first and second cooperative communication methods.

The other transmitting apparatus may include at least one antenna.

According to an aspect of another exemplary embodiment, there is provided a receiving apparatus which receives a signal transmitted in the MISO method. The receiving apparatus may include: a receiver configured to receive a first signal from a first transmitting apparatus and receive a second signal from a second transmitting apparatus; and a signal processor configured to process the received first and second signals, wherein the first and second signals are transmitted in a first cooperative communication method, and wherein the receiver is further configured to receive a plurality of signals which are transmitted via a plurality of antennas included in at least one of the first and second transmitting apparatuses in a second cooperative communication method.

Each of the first and second cooperative communication methods may be the coded cooperative communication method or the CDD cooperative communication method.

When the first cooperative communication method is the CDD cooperative communication method, and the second cooperative communication method is the coded cooperative communication method, at least one of transmission power and a delay time of each of the plurality of antennas included in the at least one of the first transmitting apparatus and the second transmitting apparatus may be different from one another.

When the first cooperative communication method is the generalized CDD cooperative communication method, and the second cooperative communication method is the coded cooperative communication method, at least one of transmission power and a delay time of each of the plurality of antennas included in the at least one of the first transmitting apparatus and the second transmitting apparatus may vary according to time or fixed.

The coded cooperative communication method may be at least one of the STBC method and the SFBC method.

The STBC method or the SFBC method may be variably selected according to time.

According to an aspect of still another exemplary embodiment, there is provided a signal processing method of a transmitting apparatus which transmits a signal to realize a diversity gain together with a signal transmitted from another transmitting apparatus in the MISO method. The method may include: allocating a first signal and a second signal to a first antenna and a second antenna, respectively, so that the first signal and the second signal are transmitted in a first cooperative communication method, and the first signal and the second signal are transmitted in a second cooperative communication method together with the signal transmitted from the other transmitting apparatus; and transmitting the first signal and the second signal through the first antenna and the second antenna, respectively.

Each of the first and second cooperative communication methods is a coded cooperative communication method or a cyclic delay diversity (CDD) cooperative communication method.

When the first cooperative communication method is the generalized CDD cooperative communication method, and the second cooperative communication method is the coded cooperative communication method, at least one of transmission power and a delay time of the first antenna may be different from the second antenna.

In addition, when first cooperative communication method is the generalized CDD cooperative communication method, and the second cooperative communication method is the coded cooperative communication method, at least one of transmission power and a delay time of each of the first antenna and the second antenna may vary according to time or may be fixed.

In addition, the operation of allocating the first signal and the second signal to the first antenna and the second antenna may include: performing STBC or SFBC coding of an input signal, outputting the first and second signals by performing IFFT of the coded signal, applying a cyclic delay to at least one of the IFFT-performed first and second signals, inserting a guard interval into the cyclic-delayed first and second signals, and allocating the guard-interval-inserted first and second signals to the antennas considering a diversity gain according to the first and second cooperative communication methods.

According to an aspect of still another exemplary embodiment, there is provided a signal processing method of a receiving apparatus which receives a signal transmitted in a MISO method. The signal processing method may include: receiving a first signal from a first transmitting apparatus and a second signal from a second transmitting apparatus; and processing the received first and second signals, wherein the first and second signals are transmitted in a first cooperative communication method, and wherein the method further comprises receiving a plurality of signals which are transmitted via a plurality of antennas included in at least one of the first and second transmitting apparatuses in a second cooperative communication method.

Accordingly, a cell coverage may be widened and the broadcast receiving quality may be enhanced.

Additional and/or other features of the inventive concept will be set forth in part in the description which follows and, in part, will be obvious from the description, or may be learned by practice of the exemplary embodiments.

BRIEF DESCRIPTION OF THE DRAWING FIGURES

The above and/or other aspects of the exemplary embodiments will be more apparent with reference to the accompanying drawings, in which:

FIG. 4B is a block diagram to illustrate operation of a communication system according to another exemplary embodiment;

DETAILED DESCRIPTION OF THE EXEMPLARY EMBODIMENTS

Certain exemplary embodiments of the inventive concept will now be described in greater detail with reference to the accompanying drawings.

The matters defined in the description, such as detailed construction and elements, are provided to assist in a comprehensive understanding of the inventive concept. Thus, it is apparent that the exemplary embodiments can be carried out without those specifically defined matters. Also, well-known functions or constructions are not described in detail since they would obscure the inventive concept with unnecessary detail.

Figure 1:
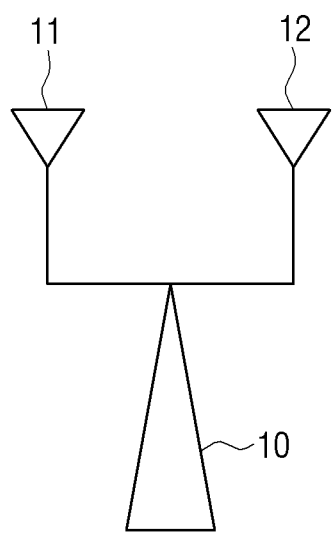
FIG. 1 illustrates an example of implementation of a transmitting apparatus including multiple antennas according to an exemplary embodiment.

FIG. 1 illustrates an example of implementation of a transmitting apparatus including multiple antennas according to an exemplary embodiment.

With reference to FIG. 1, the transmitting apparatus 10 (e.g. a transmitting tower or a base station) may include a plurality of antennas 11 and 12.

The plurality of antennas 11 and 12 may transmit data at the same time, but different data may be transmitted via the plurality of antennas 11 and 12 according to coding methods.

More specifically, a space-time coding (STC) technology may be applied to a communication system according to an exemplary embodiment. The STC is a technology to code the same data to a plurality of transmission antennas in order to enhance reliability of transmission data. Since the same signal is coded and transmitted to the transmission antennas, a signal to noise ratio (SNR) may be enhanced by transmission diversity so that the reliability of data may be enhanced. According to signal coding methods, there are two types of STCs, a space-time trellis code (STTC) using a trellis code, and a space-time block code (STBC) using a block code.

In addition, a space-frequency block coding (SFBC) technology may be applied to a communication system according to another exemplary embodiment. The SFBC which is similar to the STBC is a method of obtaining diversity by converting a signal using frequency and antennas. The SFBC is the same as the STBC in terms of a rate, and the STBC and the SFBC have strengths or weaknesses according to a channel environment.

For convenient description, the present invention describes a case of using the STBC.

In particular, an orthogonal frequency division multiplexing (OFDM) transmission method may be used according to an exemplary embodiment. The OFDM method is a kind of multicarrier transmission using a plurality of carriers. In the OFDM method, a transmission period of each channel increases as many as the number of the carriers. In this case, since a frequency selective channel occurring in broadcast transmission approximates a frequency non-selective channel in which there is no inter-symbol interference, a simple single-tab equalizer compensates it.

As an example, Table 1 below shows transmission data according to time when the base station 10 uses the STBC method. The STBC is a coding method defined in IMT-2000 wireless interface standards. The STBC has the effect of obtaining a diversity gain capable of reducing the influence of multipath fading without requiring an additional bandwidth in a multi-antenna system.

TABLE 1

|  | Time t (or frequency k) | Time t + 1 (or frequency k + 1) |
| --- | --- | --- |
| Antenna 1 | $S_1$ | $-S_2^*$ |
| Antenna 2 | $S_2$ | $S_1^*$ |

With reference to Table 1, in order to transmit a pair of data $S_1$ and $S_2$ via antenna 1 (11) and antenna 2 (12), antenna 1 (11) transmits $S_1$ and antenna 2 (12) transmits $S_2$ at time t or $k^{th}$ frequency. In addition, at subsequent transmission time t+1 or $k+1^{th}$ frequency, antenna 1 (11) may transmit $-S_2^*$ and antenna 2 (12) may transmit $S_1^*$. Unlike Table 1, it is possible to transmit the four signals, $S_1$, $S_2$, $S_1^*$, and $-S_2^*$ by selecting an order and an antenna in a time or frequency domain in diverse methods. For example, at time t or $k^{th}$ frequency, antenna 1 (11) may transmit $S_1$ and antenna 2 (12) may transmit $-S_2^*$, and at subsequent transmission time t+1 or $k+1^{th}$ frequency, antenna 1 (11) may transmit $S_2$ and antenna 2 (12) may transmit $S_1^*$. In a similar method, when there are minus signs in an odd number of signals among the four signals, $S_1$, $S_2$, $S_1^*$, and $S_2^*$, the STBC or SFBC may be implemented using them. For example, using $S_1$, $S_2$, $-S_1^*$, and $S_2^*$, the STBC or SFBC may be implemented.

In this case, a receiving apparatus (not shown) may obtain good quality and enhancement of a data transmission rate by demodulating the signals received from the two antennas.

Figure 2A:
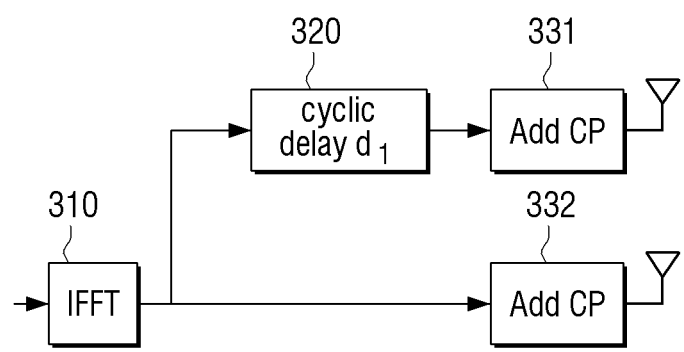
FIGS. 2A to 2C illustrate a cyclic delay diversity method and a space-time block coding method, according to an exemplary embodiment.
Figure 2B:
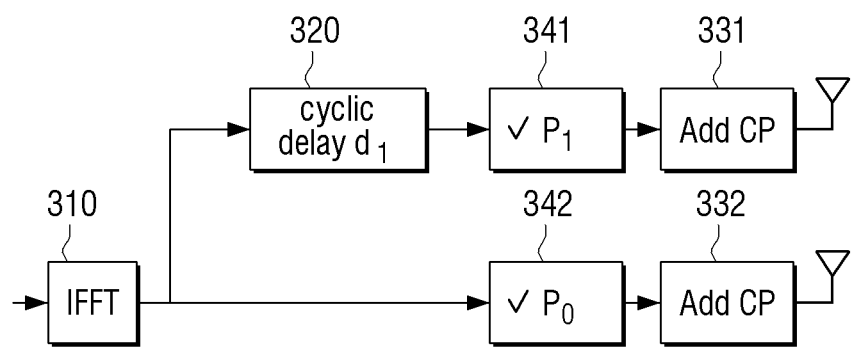
Figure 2C:
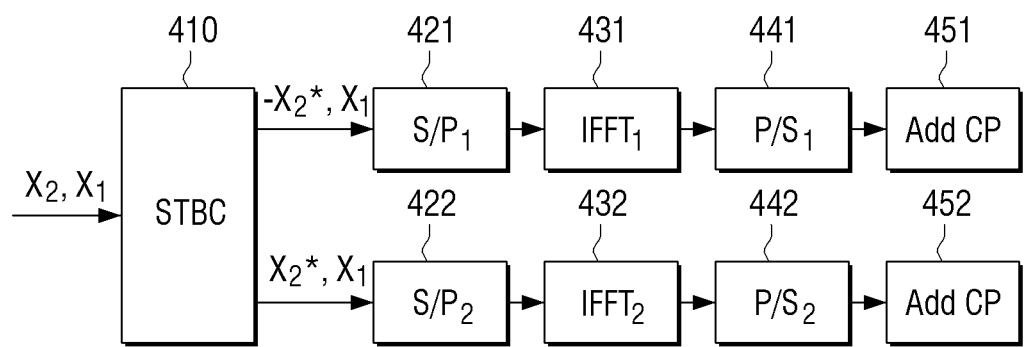

FIGS. 2A to 2C illustrate a cyclic delay diversity (CDD) method and a space-time block coding method to help understanding of the inventive concept.

FIG. 2A illustrates the cyclic delay diversity method. For convenient description, it is assumed that signals are transmitted via two antennas.

With reference to FIG. 2A, an input data stream is output from an inverse fast Fourier transformer (IFFT) 310 as a plurality of OFDM sample data in parallel.

A delayer 320 performs cyclic delay of each of at least one of the OFDM signals output in parallel using a delay value of $d_1$.

Guard interval inserters 331 and 332 insert a guard interval to a signal output from the IFFT 310 and a signal output from the delayer 320. The data having the guard interval are transmitted via the antennas.

That is, according to the antennas, a different delay is applied to a time domain signal transmitted via each antenna as described above. In this case, before the delays are applied, the signals may be the same. Since this has the effect of increasing the amount of multipath, frequency selectivity of the channel may increase. Accordingly, a receiving end may detect a signal in the same method as when transmitting a signal using one antenna regardless of the number of the antennas of the transmitting end. That is, the receiving end does not need to know the delay value added by the transmitting end.

FIG. 2B illustrates a modified example of the cyclic delay diversity method.

The CDD method as shown in FIG. 2A has a weakness of being vulnerable to a multipath channel and an additive white Gaussian noise (AWGN) channel.

Accordingly, power control 341 and 342 is performed to a signal output from the IFFT 310 and a signal output from the delayer 320 as shown in FIG. 2. In this case, the CDD method in the AWGN channel may be compensated.

FIG. 2C illustrates the space-time block coding method.

With reference to FIG. 2C, a base station transmits data through multipath using two antennas. That is, 2N modulated symbols in two (2) OFDM symbols are STBC-coded and OFDM-modulated, and are output via the two antennas.

First of all, an STBC block 410 receives OFDM symbols $X_1$ ($X_1=[X_1(0), X_1(1), \ldots, X_1(N-1)]$) and $X_2$ ($X_2=[X_2(0), X_2(1), \ldots, X_2(N-1)]$) sequentially, performs coding in parallel, and outputs 2N STBC-coded vector data at the same time.

That is, the STBC block 410 performs coding in the order of $X_1$ and $-X_2^*$ for data input in the order of $X_1$ and $X_2$ with respect to the first antenna.

In addition, the STBC block 410 performs coding in the order of $X_2$ and $X_1^*$ with respect to the second antenna.

A first S/P block 421 sequentially inputs vector data of $X_1$ and $-X_2^*$ of an N unit output from the STBC block 410, and outputs N parallel data. The N parallel data are output by the first IFFT block 431 as N OFDM sample data $[X_1(0), X_1(1), \ldots, X_1(N-1)]$ in parallel. A first P/S block 441 receives the OFDM sample data output from the IFFT block 431 in parallel, and converts the parallel data into serial data.

A first guard interval insertion block 451 copies the last G OFDM sample data among the OFDM sample data in the OFDM symbol having the N OFDM sample data, inserts the copied data into a front end of the OFDM symbol, and outputs a signal $[X_1(N-G), X_1(N-G-1), \ldots, X_1(N-1), X_1(0), X_1(1), \ldots, X_1(N-1)]$.

In addition, a second S/P block 422 sequentially inputs vector data of X2 and X1* of an N unit output from the STBC block 410, and outputs N parallel data. The N parallel data are converted and output by the second IFFT block 432 as N OFDM sample data. A second P/S block 442 receives the OFDM sample data output from the second IFFT block 432 in parallel, and converts the parallel data into serial data.

A second guard interval insertion block 452 copies the last G OFDM sample data among the OFDM sample data in the OFDM symbol consisting of the N OFDM sample data, inserts the copied data into a prefix of the OFDM symbol, and outputs a signal $[X_2(N-G), X_2(N-G-1), \ldots, X_2(N-1), X_2(0), X_2(1), \ldots, X_2(N-1)]$.

Figure 3A:
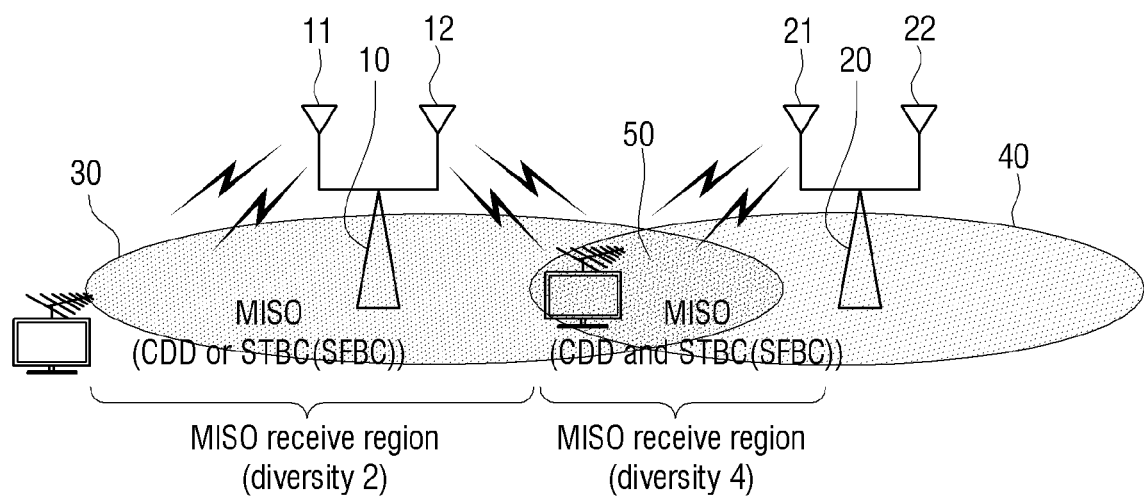
FIGS. 3A and 3B are schematic diagrams of operation of a communication system including the transmitting apparatus shown in FIG. 1 according to exemplary embodiments.
Figure 3B:
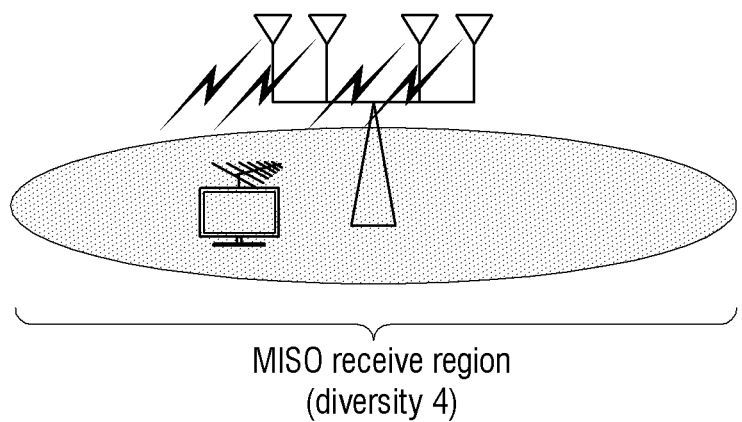

FIGS. 3A and 3B are schematic diagrams of operation of a communication system including the transmitting apparatus 10 shown in FIG. 1 according to an exemplary embodiment.

With reference to FIG. 3A, when two transmitting apparatuses 10 and 20 (or transmitting towers) each including two antennas 11 and 12, and 21 and 22, four signals (diversity order 4) are received in a border area 50 between cells 30 and 40, and signals (diversity order 2) transmitted by two antenna are received in a non-border area.

With reference to FIG. 3B, when one transmitting apparatus (or transmitting tower) includes four antennas, signals (diversity order 4) transmitted from the four antennas may be received in a cell. In FIG. 3B, it is possible that signals transmitted from more than four antennas may be received in a border area between cells by cooperation of a plurality of cells as in FIG. 3A.

More specifically, in the border area 50 between the cells 30 and 40, four signals (diversity order 4) transmitted in an STBC (or SFBC) and generalized CDD are received. In addition, in a non-border area, signals transmitted in one of the STBC (or SFBC) and generalized CDD are received, and thus, signals (diversity order 2) transmitted by two antenna are received.

Accordingly, the receiving apparatus may obtain space-time diversity using a space-time block code receiving method, and obtain cyclic delay diversity using a cyclic-delayed and transmitted signal.

Operations of the communication system according to various exemplary embodiments are described in detail with reference to drawings.

Figure 4A:
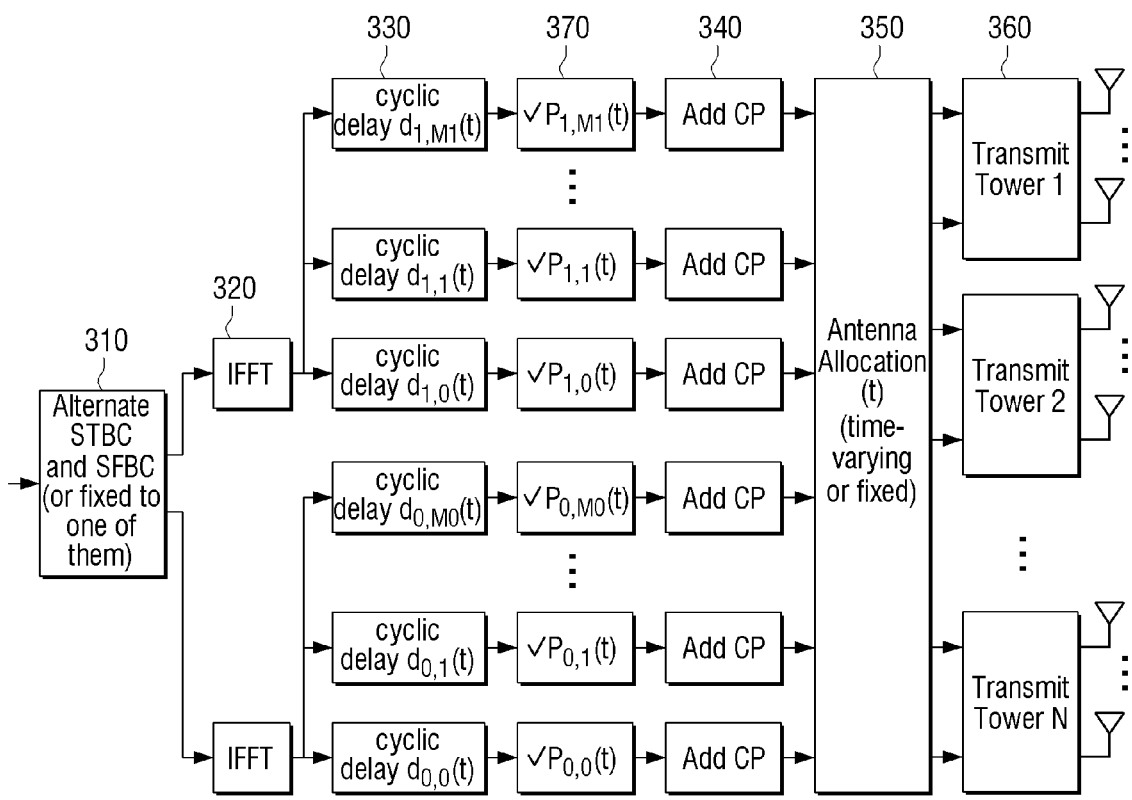
FIG. 4A is a block diagram to illustrate operation of a communication system according to an exemplary embodiment.

FIG. 4A is a block diagram to illustrate operation of a communication system according to an exemplary embodiment.

With reference to FIG. 4A, the communication system 300 may include a coder 310, an IFFT 320, a delayer 330, a power allocator 370, a guard interval inserter 340, an antenna allocator 350, and a transmitter 360.

The components shown in FIG. 4A are briefly described. Two signals encode in an STBC (or SFBC) are converted into $M_1+1$ and $M_0+1$ OFDM signals respectively using $M_1+1$ and $M_0+1$ cyclic delays ($d_{k,i}(t)$) and transmission powers ($P_{k,i}(t)$) at the $t^{th}$ transmission. Accordingly, $M_0+M_1+2$ OFDM signals are distributed to N transmitting towers.

All of the cyclic delays and transmission powers may have values which change according to time or have fixed values. The STBC or the SFBC may be selected according to time, or one of the STBC and the SFBC may be steadily used. The antenna allocator 350 may allocate OFDM signals to different transmitting towers differently according to time, or allocate signals in a fixed manner.

The components shown in FIG. 4A is described in greater detail. A symbol mapper (not shown) modulates an input signal (or data). More specifically, the symbol mapper may modulate an input signal in a phase-shift keying (PSK)/quadrature amplitude modulation (QAM) method such as 8PSK, 16QAM, 64QAM, and QPSK. In this case, each modulation method performs modulation in a unique symbol mapping method.

The coder 310 performs space-time coding of a signal output from the symbol mapper. More specifically, the coder 310 performs the STBC (or SFBC) of a signal output from the symbol mapper. The STBC is a coding method defined in IMT-2000 wireless interface standards based on $3^{rd}$ generation partnership project (3GPP) wideband code division multiple access (WCDMA). The STBC has an effect of obtaining a diversity gain capable of reducing the influence of multipath fading without requiring an additional bandwidth in a multi-antenna system.

The IFFT 320 performs inverse fast Fourier transformation (IFFT) of a signal output from the coder 310, and thus converts a signal in a frequency domain into an OFDM signal in a time domain which may be actually transmitted.

The delayer 330 applies a cyclic delay to a signal output from the IFFT 320, that is, a time domain signal. More specifically, the delayer 330 may control a delay degree in order for each antenna to gain the maximum diversity. A cyclic delay having a value of 10 or more may be applied. For example, a cyclic delay between 10 and 30 may be applied. Here, the delayer 330 applies both $M_1+1$ cyclic delays and $M_0+1$ cyclic delays to the STBC (or SFBC) coded signals, respectively. According to an exemplary embodiment, however, the $M_1+1$ cyclic delays or $M_0+1$ cyclic delays may be omitted to differently achieve a diversity gain, similar to the cyclic delay method of FIG. 2A or 2B.

The power allocator 370 adjusts transmission power of each antenna. The transmission powers of the antennas may be limited to have a difference of 10 dB or less. For example, the transmission powers of the antennas may be limited to have a difference between 3 dB and 10 dB.

The guard interval inserter 340 inserts a guard interval to data output from the delayer 330.

More specifically, the guard interval inserter 340 detects time domain signals which are located at a cyclic prefix among data output from the delayer 330, and places the detected prefix signals at a fixed position of a time axis by doing subtraction operation of the detected prefix signals and a predetermined cyclic prefix value. That is, a cyclic prefix is set to G guard intervals, and is inserted into a front end of OFDM sample data. The symbols inserted into the guard interval are referred to as a cyclic prefix (CP). The length of the CP has to be longer than the length of channel impulse response (CIR) indicating a channel characteristic of a wireless channel.

The antenna allocator 350 may allocate data to transmit to each antenna considering a diversity gain. More detailed allocation method will be described with reference to drawings later.

The transmitter 360 transmits data allocated by the antenna allocator 350. The transmitter 360 may be implemented with at least one antenna.

Accordingly, the transmitting apparatus may gain space-time diversity using the space-time block code receiving method, and gain cyclic delay diversity using a cyclic-delayed and transmitted signal.

FIG. 4B is a block diagram to illustrate operation of a communication system according to another exemplary embodiment.

With reference to FIG. 4B, the communication system 300' may include a coder 310, a phase shifter 380, an IFFT 320, a power allocator 370, a guard interval inserter 340, an antenna allocator 350, and a transmitter 360.

A cyclic delay in a time domain and a phase shift in a frequency domain have mathematically the same effect. Accordingly, the communication system 300' according to another exemplary embodiment as shown in FIG. 4B may include the phase shifter 380 instead of the delayer 330 as shown in FIG. 4A.

More specifically, a cyclic delay of $d_{a,b}(t)$ in a time domain is the same as multiplying the $k^{th}$ subcarrier by $f(d_{a,b}(t),$ $$k) = \exp\left(-\frac{j2\pi d_{a,b}(t)k}{N}\right)$$

which is a value to generate a phase difference in a frequency domain.

More generally, $f(d_{a,b}(t),k)$ which generates a phase shift may be shifted in a different form. In this case, a diversity effect which is different from the existing CDD is gained, which is referred to as enhanced single frequency network (eSFN). In the present exemplary embodiment, it is referred to as generalized cyclic delay diversity (CDD). For example, it is $f(d_{a,b}(t),k)=\exp(j\theta_{a,b}(k)+j\theta_{a,b}(k-1))$ where when subcarrier index k is 0, $\theta_{a,b}(k)$ becomes $TX_{a,b}(0)7/13\pi$, and when k is not 0, $\theta_{a,b}(k)$ becomes $TX_{a,b}(k)3/13\pi$, and $TX_{a,b}(k)\in\{-1, 0,1\}$.

Here, the phase shifter 380 applies both $M_1+1$ phase shifts and $M_0+1$ phase shifts to the STBC (or SFBC) coded signals, respectively. According to an exemplary embodiment, however, the $M_1+1$ phase shifts or $M_0+1$ phase shifts may be omitted to differently achieve a diversity gain.

Figure 5:
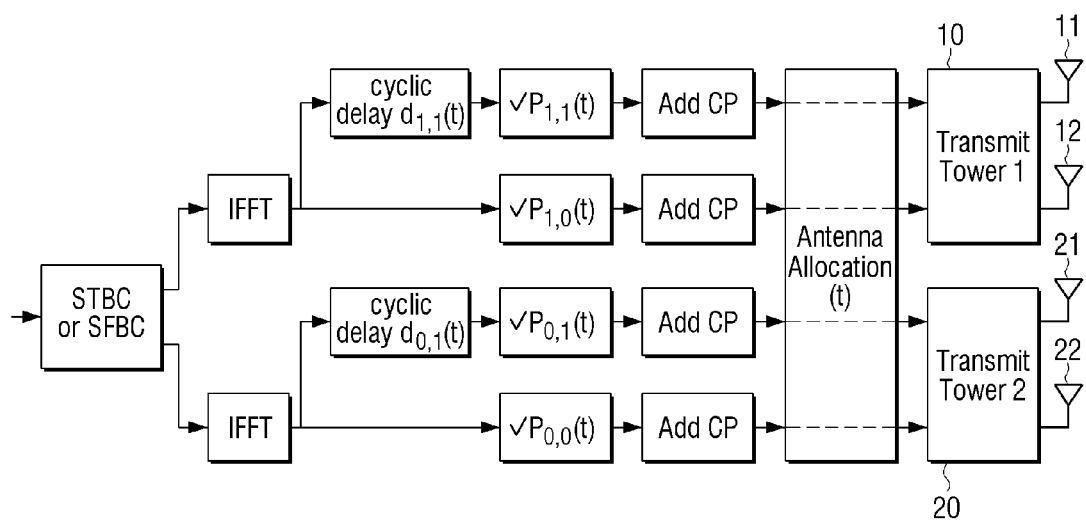
FIGS. 5 to 7 illustrate an antenna allocation method according to various exemplary embodiments.
Figure 6:
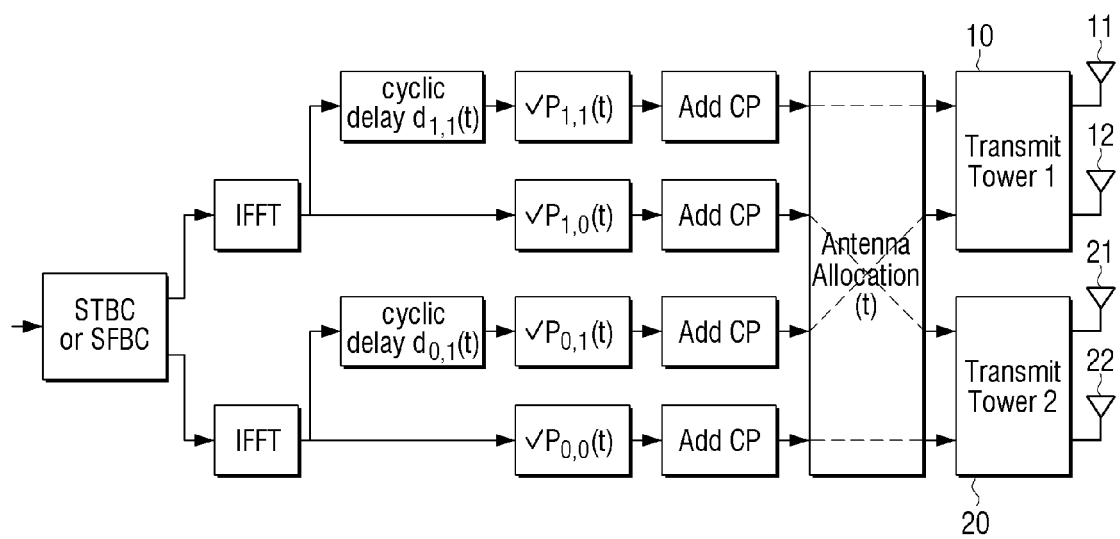
Figure 7:
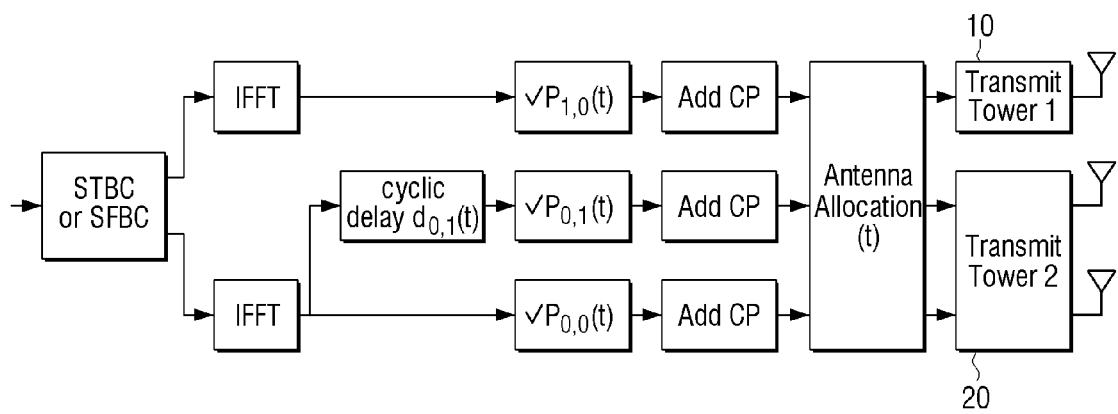

FIGS. 5 to 7 illustrate an antenna allocation method according to various exemplary embodiments.

FIG. 5 is a block diagram of an implementation example of the transmission system according to an exemplary embodiment.

With reference to FIG. 5, two transmitting towers 10 and 20 each may include two antennas 11 and 12, and 21 and 22. That is, the first transmitting tower 10 may include the first and second antennas 11 and 12, and the second transmitting tower 20 may include the third and fourth antennas 21 and 22.

In this case, a signal is transmitted in each transmitting towers 10 and 20 using the generalized CDD technology, and a signal is transmitted between the transmitting towers 10 and 20 using the STBC (or SFBC) technology. Accordingly, a diversity gain may be acquired.

FIG. 6 is a block diagram of another implementation example of the transmission system according to an exemplary embodiment.

With reference to FIG. 6, a signal is transmitted in each transmitting tower 10 and 20 using the STBC (or SFBC) technology, and a signal is transmitted between the transmitting towers 10 and 20 using the generalized CDD technology. Accordingly, a diversity gain may be acquired.

FIG. 7 is a block diagram of yet another implementation example of the transmission system according to an exemplary embodiment.

With reference to FIG. 7, the general inventive concept may be applied even when the number of antennas of two transmitting towers 10 and 20 is different. For example, the first transmitting tower 10 may include a first antenna 11, and the second transmitting tower 20 may include second and third antennas 21 and 22.

In this case, a signal is transmitted in the second transmitting tower 20 using the generalized CDD technology, and a signal is transmitted between the transmitting towers 10 and 20 using the STBC (or SFBC) technology. Accordingly, a diversity gain may be acquired.

Figure 8A:
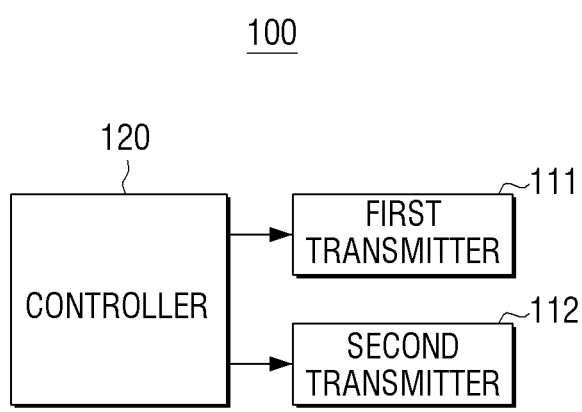
FIG. 8A is a block diagram of a configuration of the transmitting apparatus according to an exemplary embodiment.

FIG. 8A is a block diagram of a configuration of the transmitting apparatus according to an exemplary embodiment.

With reference to FIG. 8A, the transmitting apparatus 100 may include a first transmitter 111, a second transmitter 112, and a controller 120.

The transmitting apparatus 100 may transmit a signal to realize a diversity gain together with a signal transmitted through another transmitting apparatus in the multi input single output (MISO) method.

The first transmitter 111 transmits a first signal, and the second transmitter 112 transmits a second signal. More specifically, 2N modulated symbols in two (2) OFDM symbols are STC-coded and OFDM-modulated, and are output via two antennas.

The controller 120 controls the first signal transmitted through the first transmitter 111 and the second signal transmitted through the second transmitter 112 to be transmitted in a first cooperative communication method.

In addition, the controller 120 may control the first and second signals to be transmitted in a second cooperative communication method together with a signal transmitted from another transmitting apparatus (not shown) which includes at least one antenna.

The first cooperative communication method may be a coded cooperative communication method, and the second cooperative communication method may be a generalized CDD cooperative communication method.

Alternatively, the first cooperative communication method may be the generalized CDD cooperative communication method, and the second cooperative communication method may be the coded cooperative communication method. The coded cooperative communication method may be at least one of the STBC method and the SFBC method. In this case, the STBC method or the SFBC method may be variably selected according to time.

When the first cooperative communication method is the generalized CDD cooperative communication method, and the second cooperative communication method is the coded cooperative communication method, at least one of transmission power and a delay time of the first transmitter 111 may be different from that of the second transmitter 112.

Alternatively, when the first cooperative communication method is the generalized CDD cooperative communication method, and the second cooperative communication method is the coded cooperative communication method, at least one of transmission power and a delay time of each of the first transmitter 111 and the second transmitter 112 may vary according to time or be fixed as the default.

Figure 8B:
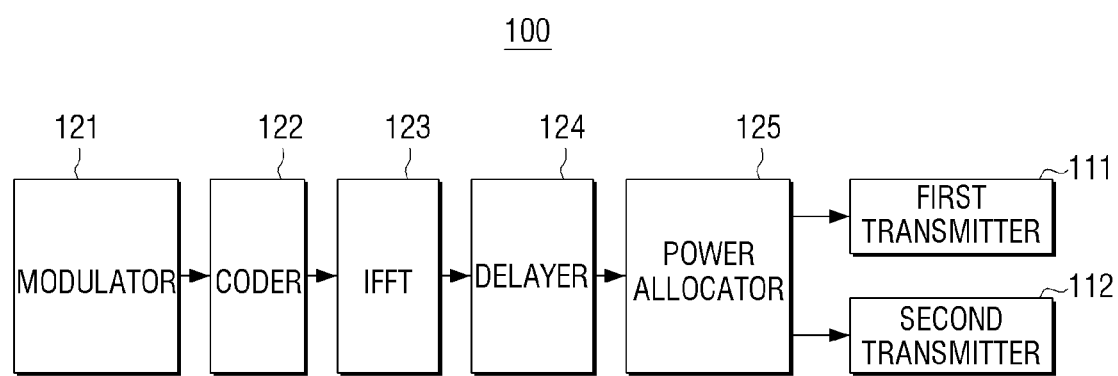
FIG. 8B is a block diagram of a detailed configuration of the transmitting apparatus shown in FIG. 8A, according to an exemplary embodiment.

FIG. 8B is a block diagram of a detailed configuration of the transmitting apparatus 100 shown in FIG. 8A.

With reference to FIG. 8B, the transmitting apparatus 100 may include a first transmitter 111, a second transmitter 112, a modulator 121, a coder 122, an IFFT 123, a delayer 124, and a power allocator 125.

The modulator 121 modulates an input signal (or data). More specifically, the modulator 121 may modulate a signal in a PSK/QAM method such as 8PSK, 16QAM, 64QAM, and QPSK. In this case, each modulation method performs modulation in a unique symbol mapping method.

The coder 122 performs space-time coding of a signal output from the modulator 121. More specifically, the coder 122 performs an STBC of a signal output from the modulator 121.

The IFFT 123 performs inverse fast Fourier transformation (IFFT) of a signal output from the coder 122, and thus converts a signal in a frequency domain into an OFDM signal in a time domain which may be actually transmitted.

The delayer 124 applies a cyclic delay to a signal output from the IFFT 123, that is, a time domain signal. More specifically, the delayer 124 may control a delay degree in order for each antenna to gain the maximum diversity. A cyclic delay having a value of 10 or more may be applied. For example, a cyclic delay between 10 and 30 may be applied.

The power allocator 125 adjusts power of the cyclic-delayed signal.

That is, the power allocator 125 adjusts transmission power of each transmitter 111 and 112, i.e. each antenna. The transmission powers of the antennas may be limited to have a difference of 10 dB or less. For example, the transmission powers of the antennas may be limited to have a difference between 3 dB and 10 dB.

The first and second transmitters 111 and 112 transmit a power-adjusted signal. The first and second transmitters 111 and 112 may be implemented with antennas.

The transmitting apparatus 100 may further include a guard interval inserter, which is not shown in FIG. 8B, to insert a guard interval into each OFDM symbol output from the power allocator 125.

In addition, the transmitting apparatus 100 may further include a P/S block (not shown) to convert an OFDM signal in a time domain in serial.

Figure 9A:
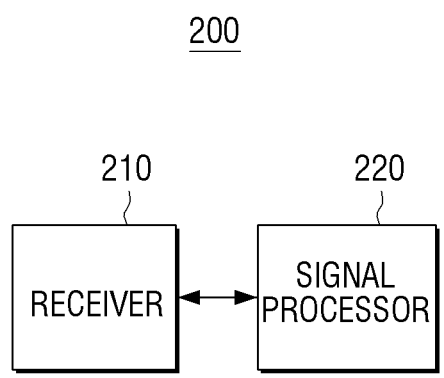
FIGS. 9A and 9B are block diagrams of a configuration of a receiving apparatus according to various exemplary embodiments.
Figure 9B:
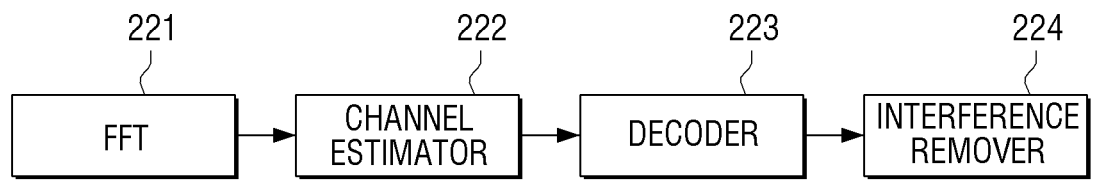

FIGS. 9A and 9B are block diagrams of a configuration of a receiving apparatus according to various exemplary embodiments.

FIG. 9A is a block diagram of a configuration of a receiving apparatus according to an exemplary embodiments.

With reference to FIG. 9A, the receiving apparatus 200 may include a receiver 210 and a signal processor 220.

The receiving apparatus 200 shown in FIG. 9A may receive a signal from the transmitting apparatus shown in FIG. 8A or 8B.

The receiver 210 receives signals from different transmitting apparatuses. The receiver 210 may be implemented with a receiving antenna. A first signal and a second signal may be transmitted in a first cooperative communication method. A plurality of signals transmitted via a plurality of antennas included in at least one of first and second transmitting apparatuses may be transmitted in a second cooperative communication method.

The first cooperative communication method may be the coded cooperative communication method, and the second cooperative communication method may be the generalized CDD cooperative communication method. Alternatively, the first cooperative communication method may be the generalized CDD cooperative communication method, and the second cooperative communication method may be the coded cooperative communication method.

When the first cooperative communication method is the generalized CDD cooperative communication method, and the second cooperative communication method is the coded cooperative communication method, at least one of transmission power and a delay time of each of a plurality of antennas included in at least one of the first and second transmitting apparatuses may be different.

Alternatively, when the first cooperative communication method is the generalized CDD cooperative communication method, and the second cooperative communication method is the coded cooperative communication method, at least one of transmission power and a delay time of each of a plurality of antennas included in at least one of the first and second transmitting apparatuses may vary according to time or be fixed as the default.

The coded cooperative communication method may be at least one of the STBC method and the SFBC method.

In addition, the STBC method or the SFBC method may be variably selected according to time.

The signal processor 220 restores a received signal by processing the signal.

For example, the signal processor 220 may include a fast Fourier transformer 221, a channel estimator 222, a decoder 223, and an interference remover 224 as shown in FIG. 9B. The signal processor 220 is not limited thereto but may be implemented in diverse forms.

The fast Fourier transformer 221 performs fast Fourier transformation (FFT) of a received signal.

The channel estimator 222 estimates a channel frequency response by estimating channels between the different transmitting apparatuses and the receiving apparatus 200.

The decoder 223 performs space-time decoding of the received signal. In particular, the decoder 223 may perform space-time block decoding.

More specifically, in order to perform STBC decoding, the decoder 223 performs linear combining and decodes the signal using a maximum likelihood (ML) method or a simple zero-forcing method. If it is assumed that a channel does not change between two temporally consecutive OFDM symbols, the STBC may be applied to the OFDM method. When a channel changes between consecutive OFDM symbols due to time varying of the channel, the STBC-OFDM cannot be applied. However, when frequency selectivity of the channel is not high and when a channel frequency response with an adjacent sub-channel hardly changes due to a large size of FFT, coding may be applied to between symbols of the adjacent sub-channel. In this case, since coding is performed in a frequency domain, SFBC-OFDM may be applied.

Since a space-time decoded received signal has a self-interference signal section, a process of removing the self-interference signal section is needed.

Accordingly, the interference remover 224 removes the interference signal section through the repeated self-interference removing process. In the repeated self-interference removing process, a process of performing symbol demapping of the space-time decoded signal at a symbol demapper (not shown), performing deinterleaving of the symbol-demapped signal at an interleaver (not shown), and performing FEC decoding of the deinterleaved signal at a FEC decoder (not shown) is sequentially performed. The processed signal is referred to as a first removal signal. The first removal signal may be used as it is as occasion demands. However, the more the removing process is repeated, the more the self-interference removing probability is enhanced. Therefore, it is desirable to repeat the removing process.

Figure 10:
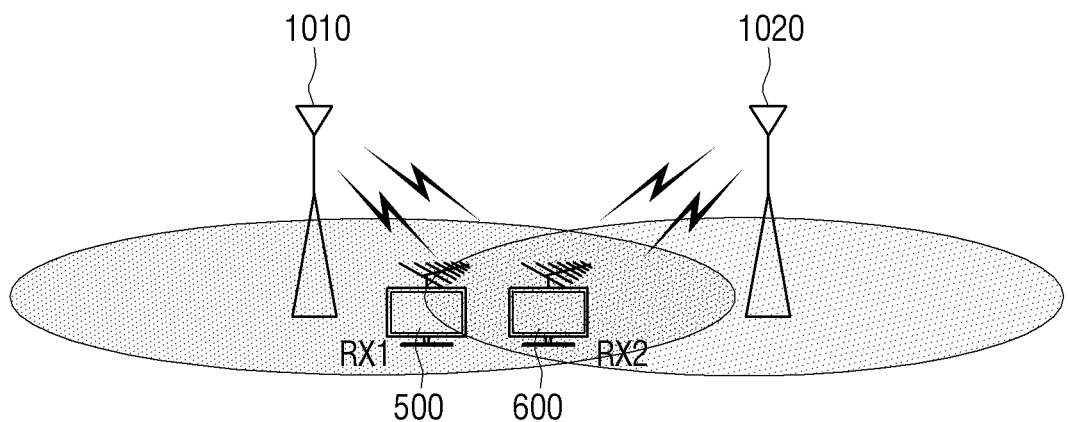
FIG. 10 illustrates the signal reception performance of the receiving apparatus according to an exemplary embodiment.

FIG. 10 illustrates the signal reception performance of the receiving apparatus according to an exemplary embodiment.

With reference to FIG. 10, receiving apparatuses RX1 (500) and RX2 (600) are in different positions. It is assumed that receiving apparatus RX1 (500) is adjacent to a left transmitting tower 1010, and receiving apparatus RX2 (600) has the same distance from the two transmitting towers 1010 and 1020.

A time taken from transmission of the transmitting tower until reception of the receiving apparatus is affected by a distance between the transmitting tower and the receiving apparatus. Accordingly, receiving apparatuses RX1 (500) and RX2 (600) receive signals having different physical delays from the two transmitting towers 1010 and 1020.

In the exemplary embodiment, since the different receiving apparatuses undergo a physical delay of an additional signal using a generalized CDD using a cyclic delay, interaction between the cyclic delay caused by generalized CDD and the physical delay of the signal occurs. In order to prevent the interaction from dissipating a final delay value stochastically, the cyclic delay value may be designed to have a value which varies according to time. Since the strength of a received signal varies according to the position of the receiving apparatus and channel fading for the same reason as the delay, transmission power may have a value which varies according to time.

Figure 11:
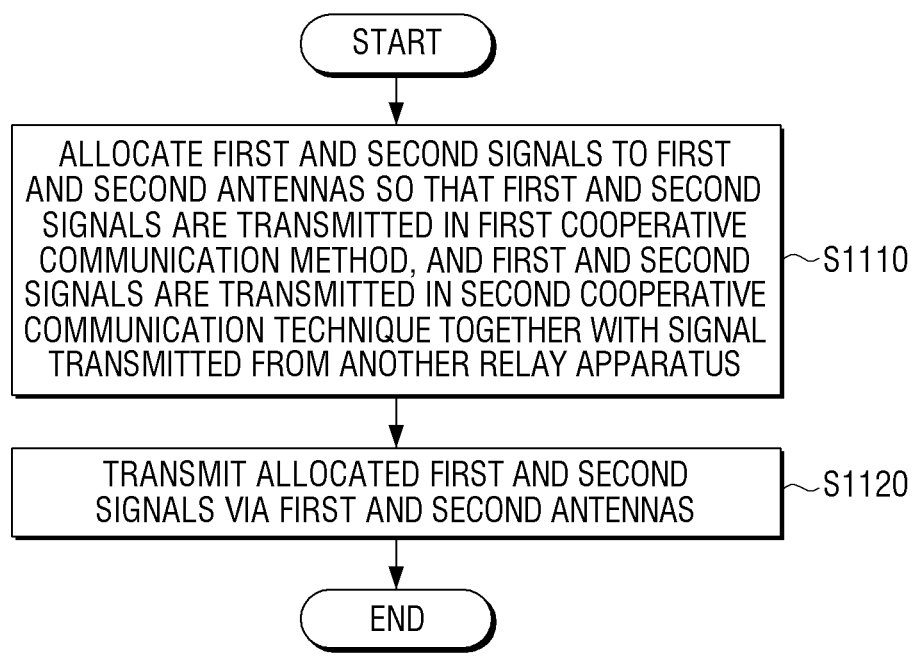
FIG. 11 is a flow chart of a signal processing method of the transmitting apparatus according to an exemplary embodiment.

FIG. 11 is a flow chart of a signal processing method of the transmitting apparatus according to an exemplary embodiment.

According to a signal processing method of the transmitting apparatus that transmits a signal to realize diversity gain together with a signal transmitted through another transmitting apparatus using the MISO method as shown in FIG. 11, the transmitting apparatus allocates processed first and second signals to first and second antennas (S1110). In this case, the transmitting apparatus allocates the first and second signals to the first and second antennas so that the first and second signals may be transmitted in a first cooperative communication method, and the first and second signals may be transmitted in a second cooperative communication method together with a signal transmitted from another transmitting apparatus.

Subsequently, the transmitting apparatus transmits the allocated first and second signals via the first and second antennas (S1120).

The first cooperative communication method may be a coded cooperative communication method, and the second cooperative communication method may be a generalized CDD cooperative communication method. Alternatively, the first cooperative communication method may be the generalized CDD cooperative communication method, and the second cooperative communication method may be the coded cooperative communication method.

When the first cooperative communication method is the generalized CDD cooperative communication method, and the second cooperative communication method is the coded cooperative communication method, at least one of transmission power and a delay time of the first antenna and the second antenna may be different.

Alternatively, when the first cooperative communication method is the generalized CDD cooperative communication method, and the second cooperative communication method is the coded cooperative communication method, at least one of transmission power and a delay time of each of the first antenna and the second antenna may vary according to time or be fixed as the default.

In addition, operation S1110 may include performing STBC or SFBC coding of an input signal, outputting the first and second signals by performing IFFT of the coded signal, applying a cyclic delay to at least one of the IFFT-performed first and second signals, inserting a guard interval into the cyclic-delayed first and second signals, and allocating the guard-interval-inserted first and second signals to the antennas considering a diversity gain according to the first and second cooperative communication methods.

Figure 12:
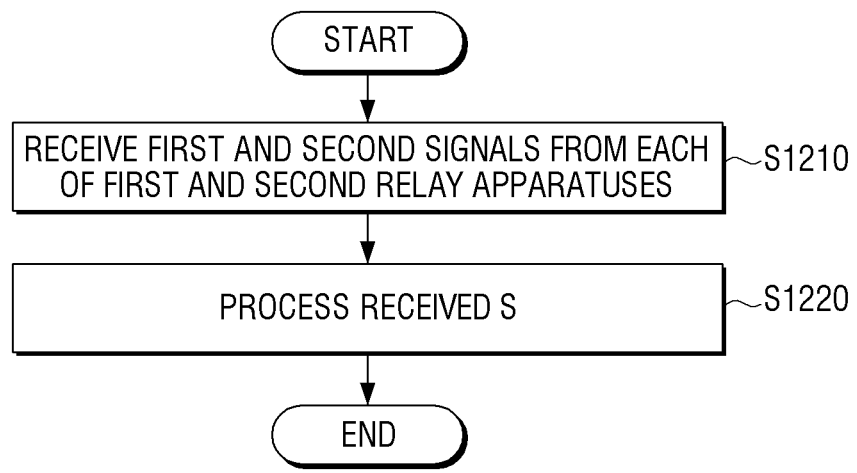
FIG. 12 is a flow chart of a signal processing method of the receiving apparatus according to an exemplary embodiment.

FIG. 12 is a flow chart of a signal processing method of the receiving apparatus according to an exemplary embodiment.

According to a signal processing method of the receiving apparatus that receives a signal transmitted in the MISO method as shown in FIG. 12, the receiving apparatus receives a first signal from a first transmitting apparatus and a second signal from second transmitting apparatus (S1210). The first and second signals may be transmitted in a first cooperative communication method. A plurality of signals transmitted via a plurality of antennas included in at least one of the first and second transmitting apparatuses may be transmitted in a second cooperative communication method.

Subsequently, the receiving apparatus processes the received signals (S1220).

The first cooperative communication method may be the coded cooperative communication method, and the second cooperative communication method may be the generalized CDD cooperative communication method. Alternatively, the first cooperative communication method may be the generalized CDD cooperative communication method, and the second cooperative communication method may be the coded cooperative communication method.

When the first cooperative communication method is the generalized CDD cooperative communication method, and the second cooperative communication method is the coded cooperative communication method, at least one of transmission power and a delay time of each of a plurality of antennas included in at least one of the first and second transmitting apparatuses may be different.

Alternatively, when the first cooperative communication method is the generalized CDD cooperative communication method, and the second cooperative communication method is the coded cooperative communication method, at least one of transmission power and a delay time of each of a plurality of antennas included in at least one of the first and second transmitting apparatuses may vary according to time or be fixed as the default.

The coded cooperative communication method may be at least one of the STBC method and the SFBC method.

In addition, the STBC method or the SFBC method may be variably selected according to time.

In the above exemplary embodiment, one transmitting tower includes two antennas, but this is merely an example. The number of antennas included in one transmitting tower is not limited thereto.

According to the various exemplary embodiments, in the environment having a plurality of antennas, broadcast signals may be received stably. In particular, in a next generation broadcast system, the methods disclosed in the present invention may widen cell coverage and enhance the broadcast receiving quality.

In addition, among diverse channel environments, an additive white Gaussian noise (AWGN) channel which may occur in a broadcast system does not have channel fading and thus has a high signal-to-noise ratio (SNR) but is a channel environment which is not suitable for CDD.

If more than two transmitting antennas are used, securing diversity using only STBC (or SFBC) cannot acquire the full rate so that loss occurs in terms of transmission capacity. Accordingly, it is meaningless to increase the number of antennas using only one of the STBC (or SFBC) and the CDD, and it is important to effectively apply and combine the STBC (or SFBC) and the CDD rather than simply combining the STBC (or SFBC) and the CDD. Thus, the present inventive concept deals with it.

The control method of the transmitting apparatus according to the various exemplary embodiments may be implemented with a program code which is executable by a computer, be stored in a non-transitory computer readable medium, and be provided to a transmitting apparatus and a receiving apparatus so that a processor may execute the program code.

For example, a non-transitory computer readable medium may be provided, in which a program is stored to control a first signal and a second signal to be transmitted in a first cooperative communication method and control the first signal and the second signal to be transmitted in a second cooperative communication method together with a signal transmitted from another transmitting apparatus.

The non-transitory computer readable medium is a medium which does not store data temporarily such as a register, a cache, and a memory but stores data semi-permanently and is readable by devices. More specifically, the diverse applications or programs may be stored in non-transitory computer readable media such as compact disks (CDs), digital video disks (DVDs), hard disks, Blu-ray disks, universal serial buses (USBs), memory cards, and read-only memories (ROMs).

The foregoing exemplary embodiments and advantages are merely exemplary and are not to be construed as limiting the present invention. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A transmitting apparatus which transmits a signal in a multi input single output (MISO) mode, the transmitting apparatus comprising:
    a first transmitter configured to transmit a first signal;
    a second transmitter configured to transmit a second signal; and
    a controller configured to control the first signal and the second signal to be transmitted in a first cooperative communication method,
    wherein the controller is further configured to control the first signal and the second signal to be transmitted together with a signal transmitted from another transmitting apparatus in a second cooperative communication method which is different from the first cooperative communication method, and
    wherein the first cooperative communication method is one of a coded cooperative communication method and a cyclic delay diversity (CDD) cooperative communication method, and second cooperative communication method is the other of the coded cooperative communication method and the CDD cooperative communication method.

2. The transmitting apparatus as claimed in claim 1, wherein when the first cooperative communication method is the CDD cooperative communication method, and the second cooperative communication method is the coded cooperative communication method, at least one of transmission power and a delay time of the first transmitter is different from the second transmitter.

3. The transmitting apparatus as claimed in claim 1, wherein when the first cooperative communication method is the CDD cooperative communication method, and the second cooperative communication method is the coded cooperative communication method, at least one of transmission power and a delay time of each of the first transmitter and the second transmitter varies according to time or is fixed.

4. The transmitting apparatus as claimed in claim 1, wherein the coded cooperative communication method is at least one of a space-time block code (STBC) method and a space-frequency block code (SFBC) method.

5. The transmitting apparatus as claimed in claim 4, wherein the STBC method or the SFBC method is variably selected according to time.

6. The transmitting apparatus as claimed in claim 1, wherein the controller comprises:
    a coder configured to perform a space-time block code (STBC) or a space-frequency block code (SFBC) coding of an input signal to output the first signal and second signals;
    an inverse fast Fourier transformer configured to perform inverse fast Fourier transform (IFFT) on the coded first and second signals;
    a delayer configured to apply a cyclic delay to at least one of the IFFT-performed first and second signals;
    a guard interval inserter configured to insert a guard interval into the cyclic-delayed first and second signals; and
    an antenna allocator configured to allocate the guard-interval-inserted first and second signals to antennas considering a diversity gain according to the first and second cooperative communication methods.

7. The transmitting apparatus as claimed in claim 1, wherein the controller comprises:
    a coder configured to perform a space-time block code (STBC) or a space-frequency block code (SFBC) coding of an input signal to output the first and second signals;
    a phase shifter configured to apply a phase delay to at least one of the coded first and second signals;
    an inverse fast Fourier transformer configured to perform inverse fast Fourier transform (IFFT) on the first and second signals at least one of which is phase-delayed;
    a guard interval inserter configured to insert a guard interval into the IFFT-performed first and second signals; and
    an antenna allocator configured to allocate the guard-interval-inserted first and second signals to antennas considering a diversity gain according to the first and second cooperative communication methods.

8. The transmitting apparatus as claimed in claim 1, wherein the other transmitting apparatus comprises at least one antenna.

9. A receiving apparatus which receives a signal transmitted in a multi input single output (MISO) mode, the receiving apparatus comprising:
    a receiver configured to receive a first signal from a first transmitter of a first transmitting apparatus and receive a second signal from a second transmitter of the first transmitting apparatus; and
    a signal processor configured to process the received first and second signals,
    wherein the first and second signals are transmitted in a first cooperative communication method,
    wherein the receiver is further configured to receive a plurality of signals which are transmitted via a plurality of transmitters included in the first transmitting apparatus and a second transmitting apparatus in a second cooperative communication method which is different from the first cooperative communication method, and
    wherein the first cooperative communication method is one of a coded cooperative communication method and a cyclic delay diversity (CDD) cooperative communication method, and second cooperative communication method is the other of the coded cooperative communication method and the CDD cooperative communication method.

10. The receiving apparatus as claimed in claim 9, wherein when the first cooperative communication method is the CDD cooperative communication method, and the second cooperative communication method is the coded cooperative communication method, at least one of transmission power and a delay time of each of the plurality of antennas included in the at least one of the first transmitter and the second transmitter is different from one another.

11. The receiving apparatus as claimed in claim 9, wherein when the first cooperative communication method is the generalized CDD cooperative communication method, and the second cooperative communication method is the coded cooperative communication method, at least one of transmission power and a delay time of each of the plurality of transmitters included in the first transmitting apparatus and the second transmitting apparatus varies according to time or is fixed.

12. The receiving apparatus as claimed in claim 9, wherein the coded cooperative communication method is at least one of a space-time block code (STBC) method and a space-frequency block code (SFBC) method.

13. The receiving apparatus as claimed in claim 12, wherein the STBC method or the SFBC method is variably selected according to time.

14. A signal processing method of a transmitting apparatus which transmits a signal together with a signal transmitted from another transmitting apparatus in a multi input single output (MISO) mode, the method comprising:
    allocating a first signal and a second signal to a first antenna and a second antenna, respectively, so that the first signal and the second signal are transmitted in a first cooperative communication method, and the first signal and the second signal are transmitted in a second cooperative communication method together with the signal transmitted from the other transmitting apparatus; and
    transmitting the first signal and the second signal through the first antenna and the second antenna, respectively,
    wherein the first cooperative communication method is different from the second cooperative communication method, and
    wherein the first cooperative communication method is one of a coded cooperative communication method and a cyclic delay diversity (CDD) cooperative communication method, and second cooperative communication method is the other of the coded cooperative communication method and the CDD cooperative communication method.

15. The method as claimed in claim 14, wherein when the first cooperative communication method is the generalized CDD cooperative communication method, and the second cooperative communication method is the coded cooperative communication method, at least one of transmission power and a delay time of the first antenna is different from the second antenna.

16. The method as claimed in claim 14, wherein when the first cooperative communication method is the generalized CDD cooperative communication method, and the second cooperative communication method is the coded cooperative communication method, at least one of transmission power and a delay time of each of the first antenna and the second antenna varies according to time or is fixed.

17. A signal processing method of a receiving apparatus which receives a signal transmitted in a multi input single output (MISO) mode, the method comprising:
    receiving a first signal from a first transmitter of a first transmitting apparatus and a second signal from a second transmitter of the first transmitting apparatus; and
    processing the received first and second signals,
    wherein the first and second signals are transmitted in a first cooperative communication method,
    wherein the method further comprises receiving a plurality of signals which are transmitted via a plurality of transmitters included in the first transmitting apparatus and a second transmitting apparatus in a second cooperative communication method which is different from the first cooperative communication method, and
    wherein the first cooperative communication method is one of a coded cooperative communication method and a cyclic delay diversity (CDD) cooperative communication method, and second cooperative communication method is the other of the coded cooperative communication method and the CDD cooperative communication method.

18. A signal transmitting apparatus comprising:
    an encoder configured to encode an input signal by space-time block coding or space-frequency block coding, to output first and second signals which contain the same data;
    a delayer configured to perform cyclic delay in a time domain or phase shifting in a frequency domain on the first signal or the second signal;
    an antenna allocator configured to allocate the first and second signals, one of which is cyclic-delayed or phase-shifted, to different antennas to transmit the first and second signals; and
    a controller configured to control the first and second signal to be transmitted in a first cooperative communication method, and control the first and second signals to be transmitted together with a signal transmitted from another transmitting apparatus in a second cooperative communication method which is different from the first cooperative communication method,
    wherein the first cooperative communication method is one of a coded cooperative communication method and a cyclic delay diversity (CDD) cooperative communication method, and second cooperative communication method is the other of the coded cooperative communication method and the CDD cooperative communication method.

19. A signal receiving apparatus comprising:
    a receiver configured to receive a first signal from a first transmitter and a second signal from a second transmitter, the first and second transmitter being included in a first transmitting apparatus; and
    a signal processor configured to process the received first and second signals,
    wherein the first and second signals contain the same data and are transmitted to the receiver in a first cooperative communication method,
    wherein the first and second signals are signals which are encoded through space-time block coding or space-frequency block coding, and then, one of the first and second signals is cyclic-delayed of phase-shifted,
    wherein the receiver is further configured to receive a plurality of signals which are transmitted via a plurality of transmitters included in the first transmitting apparatus and a second transmitting apparatus in a second cooperative communication method which is different from the first cooperative communication method, and
wherein the first cooperative communication method is one of a coded cooperative communication method and a cyclic delay diversity (CDD) cooperative communication method, and second cooperative communication method is the other of the coded cooperative communication method and the CDD cooperative communication method.

* * * * *